United States Patent [19]

Laude

[11] Patent Number: 5,080,465
[45] Date of Patent: Jan. 14, 1992

[54] DIFFRACTION GRATING AND METHOD OF MAKING

[75] Inventor: Jean-Pierre Laude, St. Cyr, France

[73] Assignee: Instruments S.A., France

[21] Appl. No.: 307,325

[22] Filed: Feb. 6, 1989

[30] Foreign Application Priority Data

Mar. 18, 1988 [EP] European Pat. Off. ........... 88400664

[51] Int. Cl.$^5$ .............................. G02B 5/18; C25F 3/02
[52] U.S. Cl. .................................... 359/571; 156/625; 359/569; 359/900
[58] Field of Search ........... 350/162.11, 162.2, 162.21, 350/162.22, 162.23, 162.19, 320; 156/625

[56] References Cited

U.S. PATENT DOCUMENTS

| | | | |
|---|---|---|---|
| 3,237,508 | 3/1966 | Keller et al. | 350/162.23 |
| 3,942,873 | 3/1976 | Shimotakahara | 350/162.23 |
| 4,647,812 | 3/1987 | Vriens et al. | 350/1.6 |

FOREIGN PATENT DOCUMENTS

| | | |
|---|---|---|
| 0059304 | 8/1982 | European Pat. Off. . |
| 9179925 | 11/1985 | European Pat. Off. . |
| 1547113 | 12/1969 | Fed. Rep. of Germany . |
| 2172883 | 5/1973 | France . |

OTHER PUBLICATIONS

Palmer; "Anomalous Behavior of Gratings at Skew Incidence"; Applied Optics, vol. 7, No. 2; Feb. 1968; pp. 353-356.
Patent Abstracts of Japan, vol. 8, no. 171 (P-293) (1608) Aug. 8, 1984.
JP-A-59 065 810 (Hitachi Seisakisha K.K.) Apr. 14, 1984.
G. Schroder: "Technische Optik" edition 4, Vogel--Buchverlag, 1984, Wurzburg, DE chapter 2.8, pp. 57-58.

Primary Examiner—Bruce Y. Arnold
Assistant Examiner—David R. Parsons
Attorney, Agent, or Firm—Handal & Morofsky

[57] ABSTRACT

A diffraction grating, comprises a plurality of grooves formed by a plurality of first facets having a first set of propagative optical characteristics. All facets are generally positioned with a first orientation. A plurality of second facets have a second set of propagative optical characteristics and are generally positioned with a second orientation. The first facets are oriented to diffract light incident on them. The second facets are oriented and have propagative characteristics which prevent perturbation of the diffracted light.

24 Claims, 7 Drawing Sheets

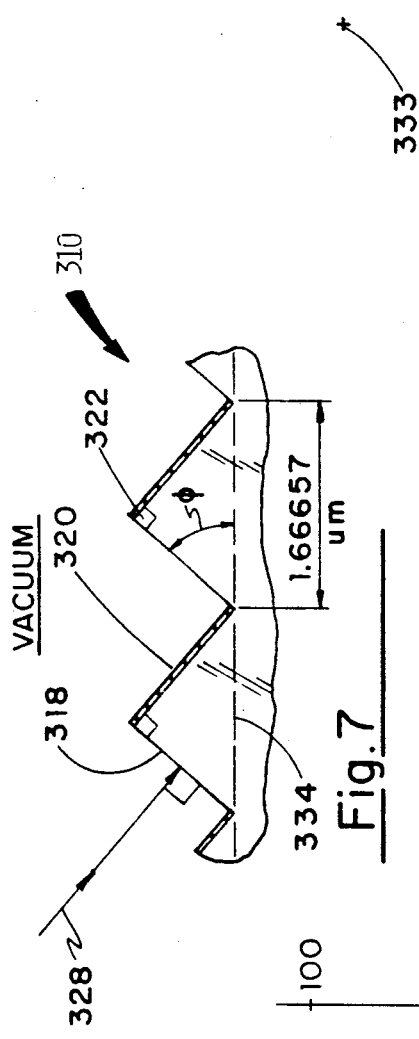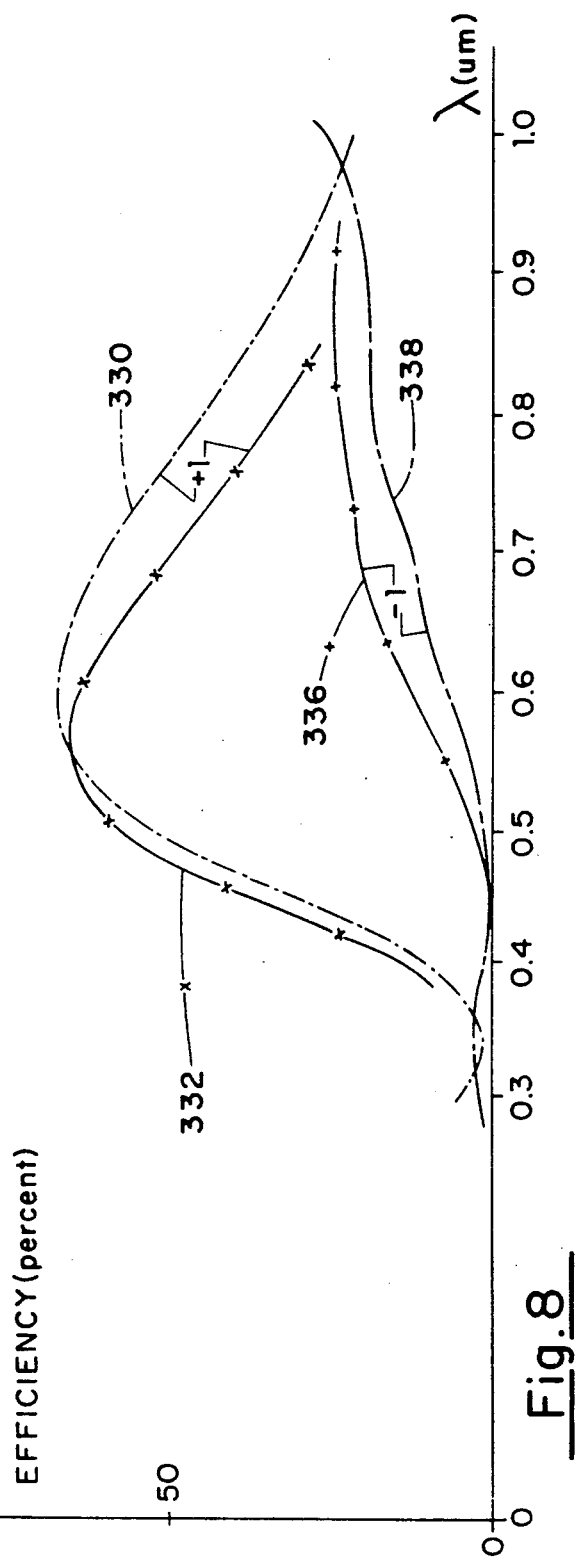
Fig. 7
Fig. 8

DIFFRACTION GRATING AND METHOD OF MAKING

TECHNICAL FIELD

The present invention relates to a diffraction grating of the transmission type in which the propagation of light to be diffracted as it travels through the grating is controlled to be substantially unperturbed in order to maximize the performance of the grating.

BACKGROUND

Early work in diffraction theory was centered around the study of the interference pattern created by one or more slits in an opaque mask, dependent upon the wavelength of the light, the width of the slits, the separation between the slits and the number of slits. Given the relatively simple geometry involved in these simple patterns, a precise understanding of the patterns involved was readily achievable.

For example, it can be demonstrated both experimentally and mathematically that varying the separation between slits while maintaining the slit width constant will maintain the scale of the overall diffraction pattern envelope while varying the scale of the interference pattern.

However, far more interesting than this is the result of maintaining both slit width and separation between slits constant while increasing the number of slits. Indeed, the discovery of the collective effects of a great number of slits forms the basis for substantially all commercially important diffractive instrumentation. In particular, it can be demonstrated that as the number of slits is increased from two, there occurs a dramatic narrowing of the interference maxima. In addition, as the principal maxima increase in sharpness, additional secondary maxima appear between the principal maxima, with their number increasing with the number of slits. With as few as twenty slits relatively well defined principal and secondary maxima are present.

A principal disadvantage of diffraction gratings comprised of a plurality of slits is the fact that a large percentage of the light which falls on the grating is absorbed by the grating and thus not available for analysis. A partial solution to this problem is the engraving of a plurality of grooves in a reflective substrate in order to form a reflective diffraction grating.

However, the relative intensities of light in the different orders in a grooved grating do not necessarily follow the simple geometric relationships which govern a grating formed by a plurality of slits and whose overall dimensions are much larger than the wavelength. Rather, instead of a relatively simple geometric problem, one must apply electro-magnetic field theory to the particular groove profile in order to calculate the diffraction pattern produced. Nevertheless, regardless of the groove profile, if the distance between the grooves is known, the position of the spectral lines will be the same as in a multiple slit grating. Indeed, in the early days of grating manufacture, the profile of the grating was considered to be largely uncontrollable.

Until World War II, gratings were ruled on so-called "speculum" metal which is a relatively hard alloy of copper and tin. During that period, the manufacture of practical diffraction gratings remained grounded in the mathematical theory developed in the early 1800's and the fabrication of practical devices was substantially limited to refining the work of Professor Rowland who was first able to rule a quality grating after developing a constant screw in the late 1800's.

A major change occurred in the nature of diffraction gratings when the ruling of gratings on aluminum commenced. In particular, it was found that by proper shaping and orientation of a diamond cutting tool it was possible to vary the shape of the profiles in such a way that they would produce a so-called "blaze" of light at any desired angle. Such blazed diffraction gratings form an important class of instruments. Over the years, they have been developed on the basis of field theory and/or iterative fabrication and experimental evaluation. Attention has thus largely been drawn away from transmission gratings and the concentration has been on improving reflection gratings due to the lack of efficiency of transmission gratings.

SUMMARY OF THE INVENTION

The invention is intended to provide a remedy. It solves the problem of how to provide an effective transmission grating. A diffraction grating, comprises a plurality of grooves formed by a plurality of first facets having a first set of propagative optical characteristics. All facets are generally positioned with a first orientation. A plurality of second facets have a second set of propagative optical characteristics and are generally positioned with a second orientation. The first facets are oriented to diffract light incident on them. The second facets are oriented and have propagative characteristics which prevent perturbation of the diffracted light.

BRIEF DESCRIPTION OF THE DRAWINGS

One way of carrying out the invention is described in detail below with reference to drawings which illustrate only one specific embodiment of the invention and in which:

FIG. 7 shows still another grating constructed in accordance with the present invention;

FIG. 8 is a graph comparing the characteristics of the grating of FIG. 7 to the calculated performance of a prior art transmission grating;

BEST MODE FOR CARRYING OUT THE INVENTION

Figure 1:
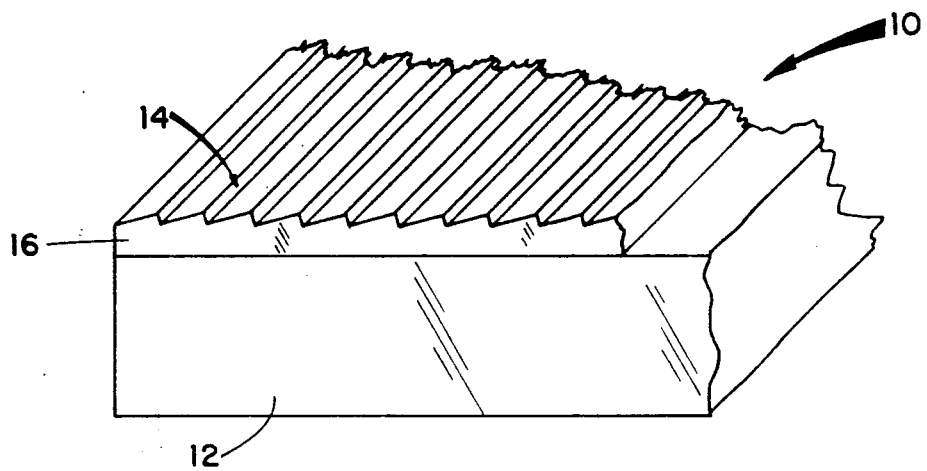
FIG. 1 is a perspective view of a portion of a diffraction grating constructed in accordance of the present invention.

In accordance with the present invention an improved diffraction grating 10 is provided on a transparent wafer substrate 12 as illustrated in FIG. 1. Diffraction is performed by a plurality of grooves 14 disposed in the face of a transparent diffracting layer 16. For purposes of illustration, the thickness of layer 16 and the size of the groove is greatly exaggerated in order to illustrate the structure in the manner customarily employed in this technology.

As noted above, substrate 12 is transparent as is the material of which layer 16 is made. It is noted that, in principle, it is possible to directly rule a plurality of grooves on a substrate 12, but as a practical matter most diffraction gratings are made by a replication process in which a master grating rules the grating in, for example, aluminum. This master grating is impressed upon an uncured plastic layer such as layer 16 supported on a transparent substrate 12. After molding of the grooves of the diffraction grating by such an operation, the rigid substrate 12 with the plastic layer 16 disposed thereon and with the shape of the groove maintained by the master is put, for example, in an oven where, for example, the two part epoxy customarily used to form layer 16 cures and solidifies layer 16, thus making the recording of grooves on the outside surface thereof permanent.

Figure 2:
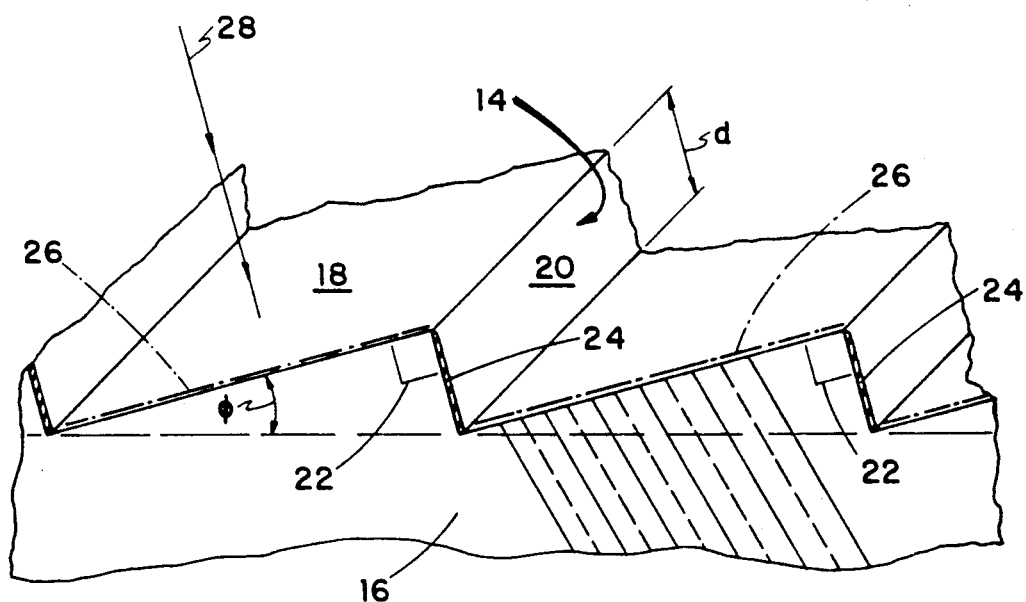
FIG. 2 is a greatly enlarged view of a portion of the grating illustrated in FIG. 1.

Referring to FIG. 2, a greatly enlarged cross-sectional view of a portion of the groove structure is illustrated. It is noted that the grating must only be locally flat and that the invention may be applied to planar as well as curved gratings such as those with concave or convex active surfaces. For example, a convex transmissive surface may incorporate a focusing function. Generally, the grooves 14 are formed by long faces 18 and short faces 20. Angle 22 formed between transmissive long face 18 and internally reflective short face 20 is, in accordance with a preferred embodiment of the invention, a right angle. Short face 20 comprises an outer surface formed by a thin layer of reflective material 24 adhered to the material forming layer 16. Reflective material 24 is selected for its high reflectivity to light inside layer 16 having a wavelength in the range over which the inventive grating 10 is intended to operate. In addition, it is also possible to improve the performance of the grating by coating long faces 18 with a layer of anti-reflection material 26 as shown in phantom lines in FIG. 2.

During use it is contemplated that incident light 28 to be analyzed will be incident on long faces 18 with an orientation perpendicular to long faces 18. In accordance with this arrangement, substantially no light will fall on short faces 20 and long faces 18 will receive substantially all incident light. For the sake of simplicity we can then consider incident light 28 as forming planar collimated wavefronts which enter layer 16 and continue in the same direction which they followed in the ambient prior to entry into layer 16. Thus, there will be present in layer 16 a planar wavefront whose direction of travel is parallel to short faces 20. The provision of reflective material 24 results in providing a means for light propagating within layer 16 to proceed substantially unperturbed through layer 16.

In the case of incoming light 28 which is polarized with its electric field extending perpendicular to short face 20, additional efficiencies will be achieved because the induced electric current in the conductive face 24 is such that the electromagnetic field satisfies the condition required by Maxwell's equations corresponding to unperturbed propagation as would occur in free space. As compared to conventional transmission gratings, the grating illustrated in FIGS. 1 and 2 exhibits superior brightness at the blazed wavelength.

As may be inferred from the above, the inventive grating will exhibit superior characteristics for a range of angles of incoming radiation other than the case of normal incident radiation discussed above.

In accordance with scalar theory, one can approximately predict the blaze wavelength $W_B$ of a grating in a vacuum using the following relationship:

$$W_B = a(n-1) \sin \phi,$$

where a is the groove spacing, $\phi$ is the angle of the long face to the plane of the diffraction grating and n is the index of refraction of the material. If we consider $n_1$ to be the index of refraction of an ambient other than vacuum and $n_2$ to be the index of refraction of layer 16, and if the incidence angle ā with respect to the normal is very small, if the angle 22 between the facets is maintained very close to 90° and further if $d(n_2-n_1)$ is equal to an even number of wavelengths, where d is the length of the short face 20:

$$(n_2 - n_1)d = kW,$$

where k is the order of the diffracted image.

As $d = a \sin \phi$, if $kW = a \sin \phi(n_2 - n_1)$, the blaze is very high when the electromagnetic field E is perpendicular to the conductive facet. A plane wave characterized by an electrical field vector perpendicular to the perfectly conducting wall propagates without being disturbed. Thus, after transmission through the surface of the grating, we from one to the next of $2k\pi$, where $k = 1, 2, 3 \ldots$. Thus, the diffracted beam of order k will be a plane wavefront transmitted substantially without discontinuity.

The same property can be approximated with an angle between face 18 and face 20 different from 90° provided the difference is not too large if the incident beam is approximately parallel to the conductive facet. The dielectric facet may also be coated with dielectric antireflective layers in order to eliminate the few per cent of Fresnel reflection $[(n_1 - n_2)/(n_1 + n_2)]^2$ at the dielectric interface. Fresnel reflection could amount to 4% if $n_1 = 1$ and $n_2 = 1.5$.

EXAMPLE 1

Figure 3:
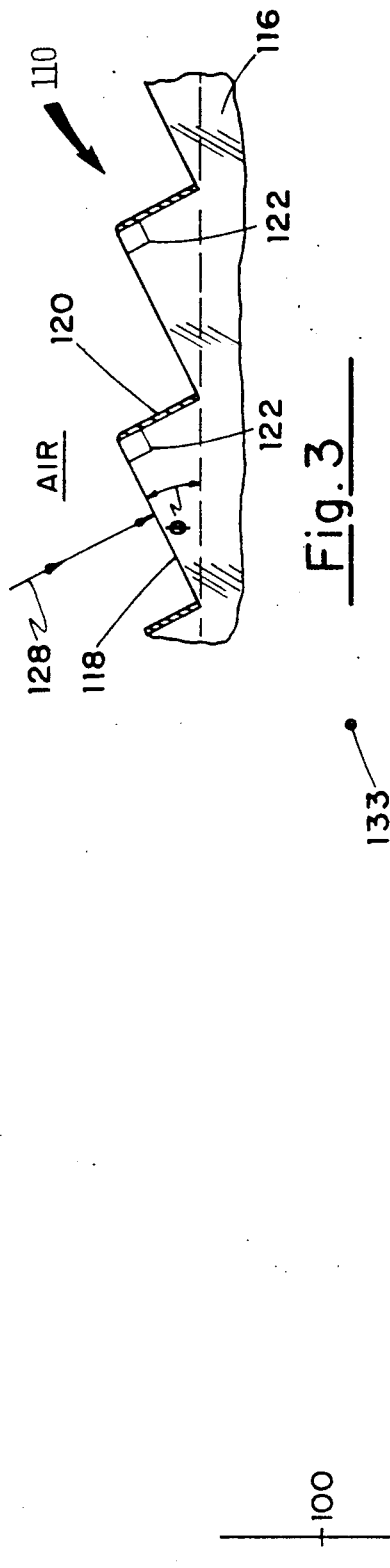
FIG. 3 is a side view of a portion of an alternative grating constructed in accordance with the present invention.

Referring to FIG. 3, where similar parts have been numbered one hundred higher than the previous figure (which convention will be repeated herein, a diffraction grating 110 constructed in accordance with the present invention is illustrated. We consider the case where the diffraction grating is situated in air and in which the angle $\phi$ with respect to the plane of the grating is 26.75°. As can be seen in the Figure, angle 122 between reflective face 120 and transmissive face 118 is a right angle and light ray 128 incident on transmissive face 118 is incident thereon at a right angle to the transmissive face. The subject grating has a groove density of 420 grooves per millimeter and a first order blaze occurs at a wavelength equal to 0.60 micrometers. The index of layer 116 is 1.5651 at W=0.6 μm.

Figure 4:
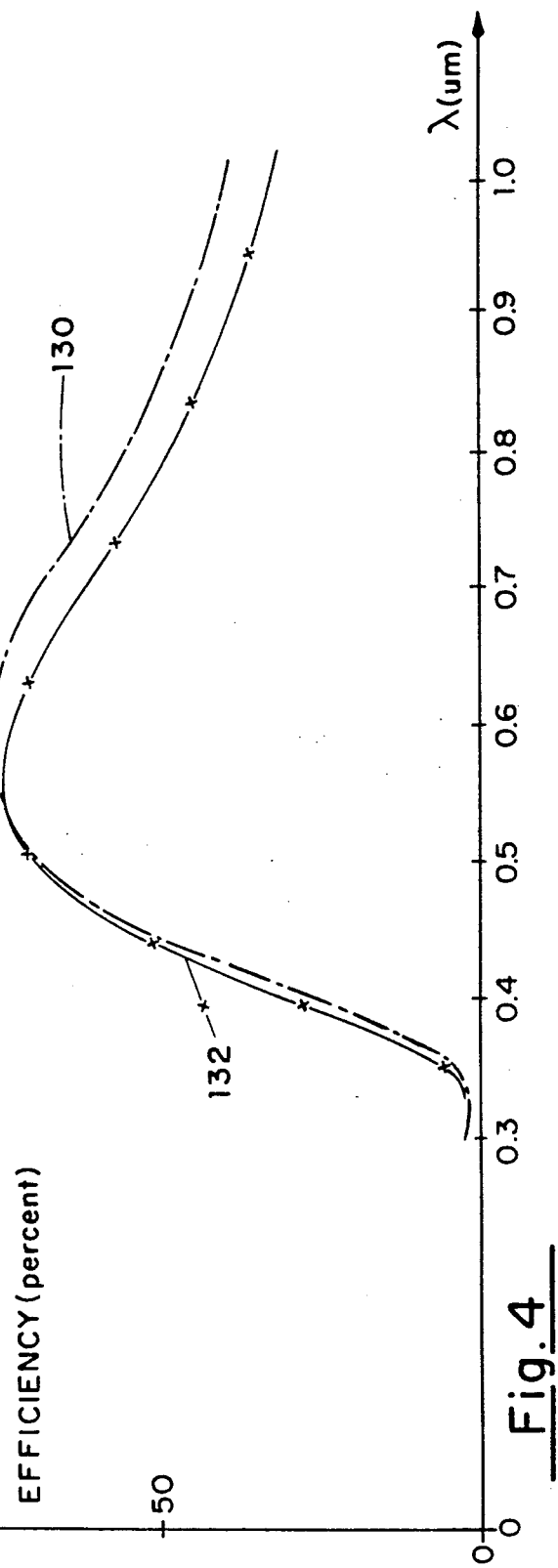
FIG. 4 is a graph comparing the experimental characteristics of the grating of FIG. 3 to the calculated performance of a prior art transmission grating.

The calculated efficiency of an unmetalized classical grating having the same dimensions as that illustrated in FIG. 3 in the first order as a function of wavelength is illustrated in FIG. 4. In particular, for polarized light having an electric field component parallel to reflective face 120, the efficiency may be found to follow curve 130 with a peak efficiency of 76.2 percent. On the other hand, for light having a polarization with the E field perpendicular to reflective face 120 the efficiency may be found to follow curve 132 in FIG. 4, with a peak efficiency of 74.2 percent. As compared to these prior efficiencies, the inventive system shows the value corresponding to point 133 for a 27% improvement.

EXAMPLE 2

Figure 5:
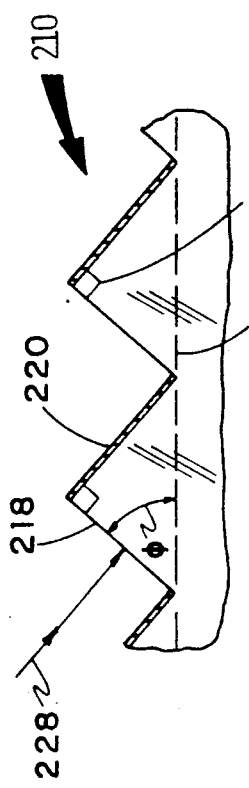
FIG. 5 is yet another grating constructed in accordance with the present invention.

Yet another grating is illustrated in FIG. 5 in which the angle of the transparent face 218 with respect to the plane of the grating 234 is 51°. Here again the reflective face 220 is at a perpendicular angle to its respective transmissive face 218 and, in the example, light is incident perpendicular to transmissive face 218. In the example, the grating is considered to be in an ambient of air. The grating of FIG. 5 has a groove density of 632 grooves per millimeter. The index of refraction of layer 216 is 1.5555 for W=0.68 μm.

Figure 6:
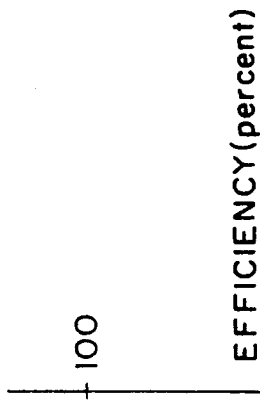
FIG. 6 is a graph comparing the experimental characteristics of the grating of FIG. 5 to the calculated performance of a prior art transmission grating.

If we consider the first order of diffraction, an unmetalized grating having the same dimensions as the grating of FIG. 5 may be found by calculation to exhibit the characteristics illustrated in FIG. 6 with a blaze wavelength of 0.68 micrometers. In particular, for light having a polarization oriented with the electric field parallel to reflective face 220, diffraction efficiency will follow curve 230 in FIG. 6. For light with polarization oriented with the electric field perpendicular to reflective face 220, efficiency will follow curve 232 with peak efficiency of 63.4%. In the case of the electric field perpendicular to the reflective face, a peak efficiency of 65.3% will be achieved. In contrast, the performance of the inventive grating is illustrated by point 233 which represents an improvement of 39%.

EXAMPLE 3

Referring to FIG. 7, yet another grating constructed in accordance with the present invention is illustrated. Here again the incident beam of light 328 is incident on transmissive face 318 at a right angle. Transmissive face 318 is perpendicular to reflective face 320. Transmissive face is positioned at an angle of 48.9° with respect to the plane of the grating 334. Here the index of refraction of the material of which the grating is made is 1.5537. The groove density is 600 grooves per millimeter.

In the event that a classical unmetalized grating with dimensions of the grating of FIG. 7 is used in a vacuum, it is found by calculation to have a blaze wavelength of 0.70 micrometers. The first order diffraction will exhibit the efficiency illustrated by curve 330 in FIG. 8 for light polarized with its electrical field parallel to the reflective face 320 (i.e. for light in the transverse electric TE polarization mode). In the case of light polarized in the transverse magnetic (TM) polarization mode (i.e. with the magnetic field parallel to the reflective face 320) the efficiency in the first order as a function of wavelength may be found to have the characteristics illustrated by curve 322. In the −1 order the TM polarization mode will exhibit the characteristics illustrated by curve 336 while in the −1 order light polarized in the TE mode may be found to have the characteristics illustrated by curve 338 in FIG. 8. As can be seen from curve 332 the peak efficiency of the grating in the transverse magnetic (TM) mode will be 64.8% as compared to the peak efficiency in the TE mode which will be 67.3%. In contrast, the inventive grating will exhibit the efficiency indicated by point 333 for an improvement of 45%.

Figure 9:
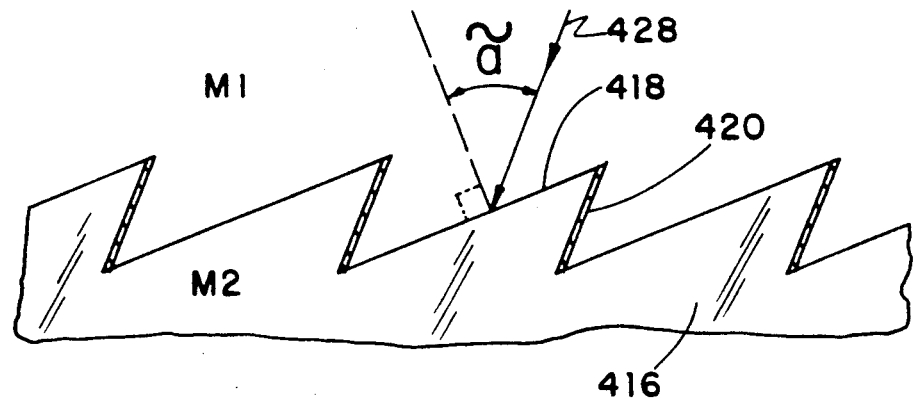
FIG. 9 is an alternative embodiment of the present invention in which the angle formed by the facets is acute.

A type of grating somewhat different from that illustrated by the various structures in FIGS. 1-8 is illustrated in FIG. 9. Here the angle between transparent face 418 and reflecting face 420 is less than 90°. However, the direction of incoming light 428 is substantially parallel to face 420. In particular, if we define the angle of incidence with respect to the normal to the transmissive face 418 as $\bar{a}$, the angle between transmissive face 418 and reflective face 420 will be equal to 90°-$\bar{a}$.

Figure 10:
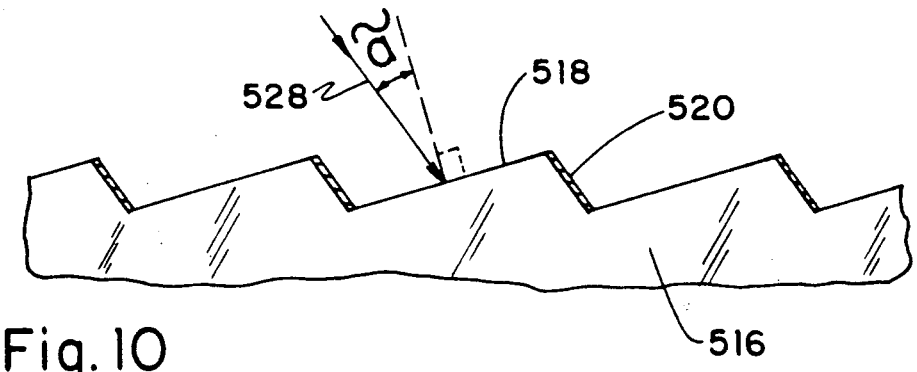
FIG. 10 is an alternative embodiment of the invention in which the angle between facets is obtuse.

A similar situation is obtained in connection with the grating illustrated in FIG. 10. Here, the angle between the reflective face 520 and its respective transmissive face 518 is greater than 90° and incoming light 528 is incident on face 518 in a direction parallel to face 520. If one considers the angle between face 518 and its respective face 520 to be u and the angle of incidence of light ray 528 with respect to a normal to face 518 as a, a desirable condition will occur for angles wherein u=90°+$\bar{a}$.

Generally, the objective of the structures and configurations illustrated in FIGS. 9 and 10 is to maintain the direction of incoming light parallel to the reflective face in order to promote the transmission of light through the grating layers 416 and 516 in a substantially unperturbed state.

Figure 11:
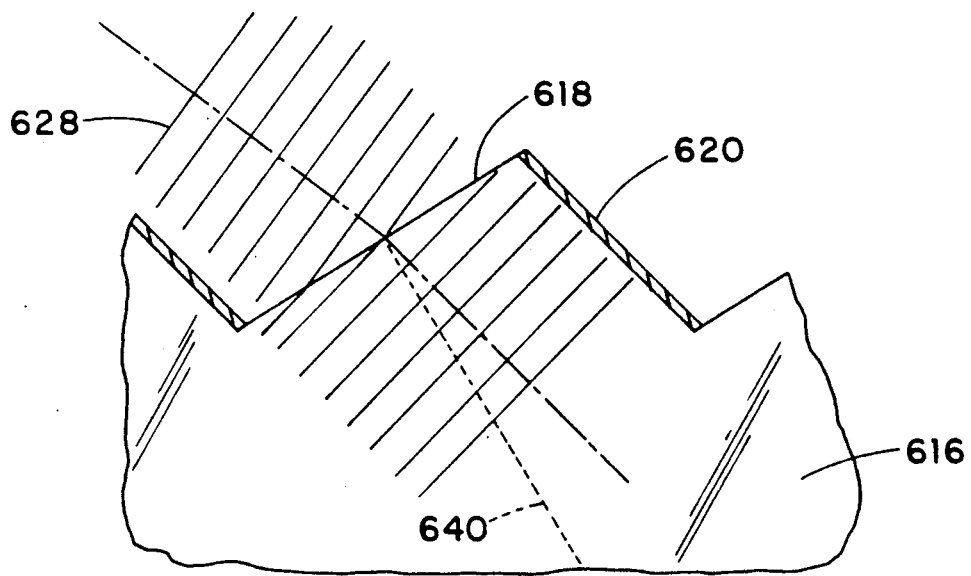
FIG. 11 is a schematic illustration of grating function illustrating a particularly advantageous mode of operation.

However, another possibility also exists and is illustrated in FIG. 11. In particular, in this embodiment a planar wave front 628 is advancing toward the transmissive face 618 of the grating at an angle with respect to the normal. As wavefront 628 enters the refractive layer 616, it is bent toward the normal to face 618, illustrated by phantom line 640 in FIG. 11. Thus, it can be seen that as a result of Snell's law the incoming rays which are not parallel to face 620 are bent in this direction once the rays enter layer 616. In this manner the unperturbed propagation of wavefront 628 through layer 616 is maintained.

In order to achieve high optical throughput low resolution spectroscopy in telescopes, designs with transmission gratings have been proposed. A classical transmission grating on a prism surface, sometimes referred to as a Carpenter's prism or "grism" offers a solution in which the mean wavelength is not angularly displaced. However, it can be shown theoretically and experimentally that with prior classical transmission gratings having a small prism interface, efficiency is always limited.

Figure 12:
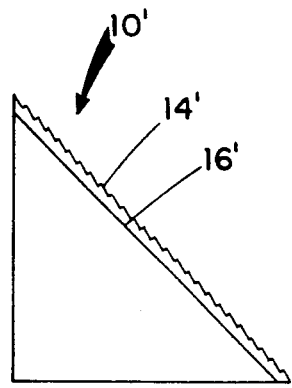
FIG. 12 is a side view of a Carpenter's prism incorporating the grating of the present invention.

FIG. 12 illustrates an embodiment of the invention wherein the inventive grating takes the form of a Carpenter's prism 10' having a layer 16' disposed on its face and bearing a plurality of grooves 14'.

Figure 13:
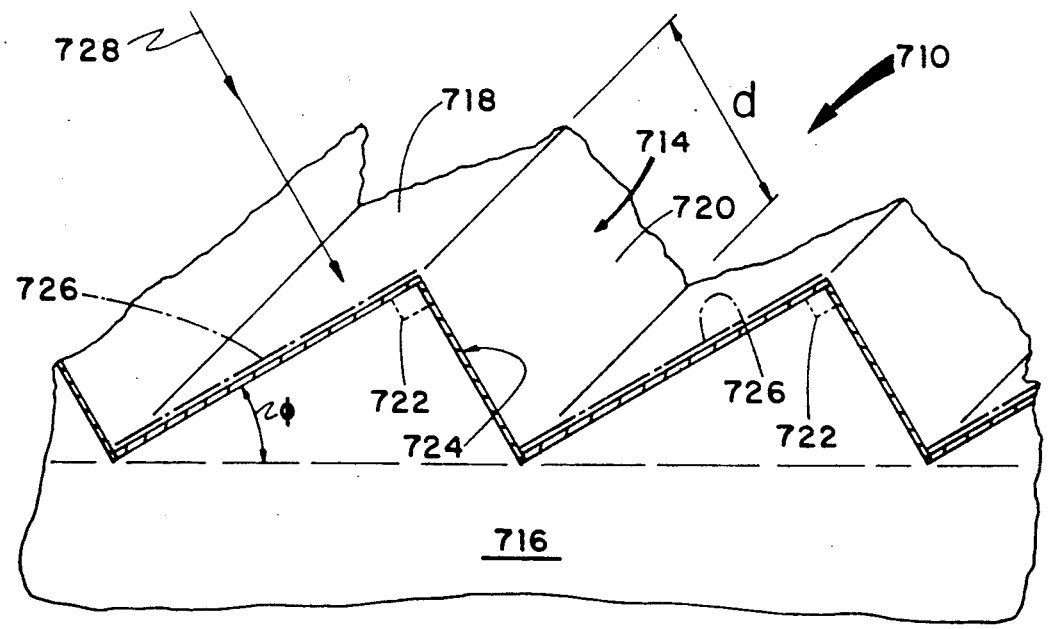
FIG. 13 is a greatly enlarged view of a reflective grating incorporating the principles of the present invention.

Still another possibility is illustrated in FIG. 13. Here the grating 710 is of the reflection type and includes a conductive metal face 718 covered with a reflective dielectric material 726 and positioned at a right angle to a conductive face 720 covered with a metallic coating 724. Light comprising a planar wavefront preferably incident normal to face 718 at a right angle is reflected by reflective layer 726 to form an interference pattern. Reflective layers 726 comprise alternate layers of $SiO_2$ and $TiO_2$. Conductive faces maintain the unperturbed reflection of light from the grating and particularly efficient operation in the case of a TE planar wavefront.

INDUSTRIAL APPLICABILITY

The present invention is particularly suitable for application to modern industrial processes. In particular, it is possible to use any one of the numerous processes for making a master grating and replications thereof. Thus, one can employ ruling with a diamond tool under interferometric control, direct holographic recording of the blazed profile by Fourier synthesis, holographic recording with stationary wave fringes, recording followed by a modification of the profile by ion etching, etching with a reactive plasma, oriented chemical etching or X ray copying.

Once a master 850 has been made, typically replicas of the grating are made although if a very high quality grating is desired, the master may be made on a transparent substrate and processed as described below for a replica.

In replication, a layer of metal 852 (generally aluminium) is put on master 850 in a vacuum evaporator. This operation is made in a poor vacuum so the aluminum does not adhere well to the master, due to pollutant traces (e.g. ambient gases).

A layer 854 of liquid epoxy resin thoroughly mixed with its hardener are put on the prepared master and a glass blank 856 is put on the epoxy and hardener to form a sandwich as illustrated in FIG. 13.

These elements are placed in an oven at, for example, 40° C. and cured at the appropriate temperature and for the time proper for the epoxy used. After this the blank and the master are separated. The replica 858 with a copy of the grating in epoxy 854, as well as layer 852 now adhered to the epoxy, is ready to have the metal layer 852 selectively removed from the transmissive faces by being ion etched.

Alternately, one may remove all the metal chemically, antireflection coat (if desired) and then use an oriented metal coating method such as that described below.

Antireflection coatings, per se, are well known. See for example Optical Production Technology, D.F. Horne, Adam Hilger Ltd, Bristol, pages 328-227. The coat may be a single coat antireflection of $Th\ F_4$ or $Mg\ F_2$, for example. This coating must be applied before the metallic coating.

When one coats with $Mg\ F_2$ in a quarter wavelength layer, if the index of refraction of the grating is 1.62, the reflectivity of the transmission grating decreases from 5.6% to 0.64%.

With a single layer, it is known that the best result is obtained with:

$$n_e = n_o N_s$$

where:
  $n_e$ = index of the evaporated coating
  $n_o$ = index of environment of grating
  $n_s$ = index of grating prismatic structure For two or more layers of antireflection coating, alternating layers of $Ti\ O_2$ and $Mg\ F_2$, or alternating layers of $Mg\ F_2$ and $Hf\ O_2$, or, less often, alternating layers of $Th\ F_4$ and $Si\ O_2$ have been used. The optical thickness of the successive layers is one quarter wavelength.

For two layers best results are obtained where:

$$n_1 = n_2(n_o/n_s)$$

where:
  $n_1$ = low index evaporated coating
  $n_2$ = high index evaporated coating
  $n_o$ = external or ambient index of refraction
  $n_s$ = index of refraction of the grating prismatic structure Antireflection coating is applied on the prismatic surface of the grating and also on the back of the transmission grating.

Figure 15:
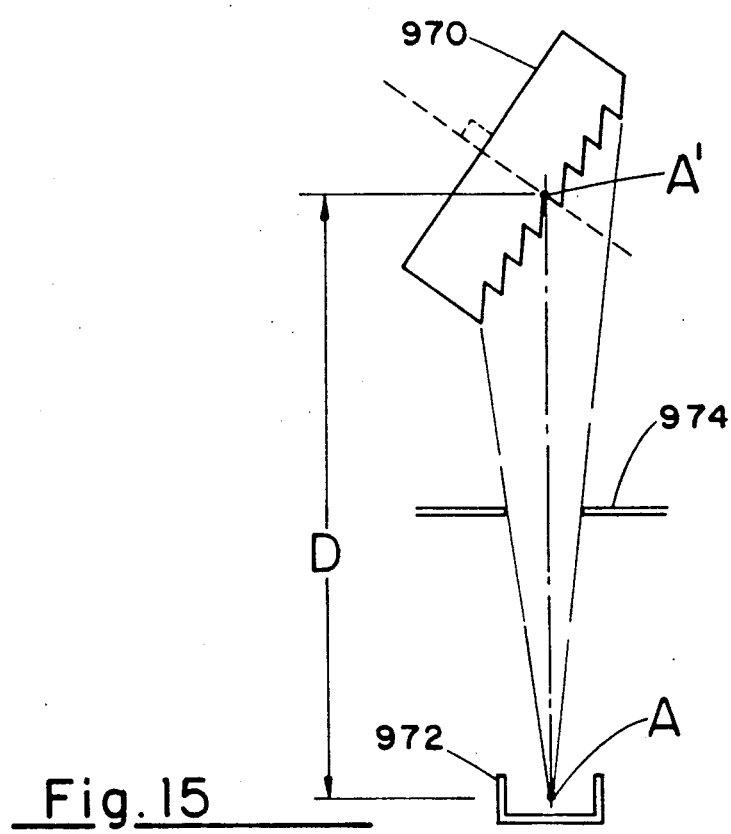
FIG. 15 illustrates vacuum metalization of the grating in accordance with the present invention.

After the grating has been coated with an antireflective layer, the transmission grating 970 (FIG. 15) is put in a vacuum evaporator. The grating is positioned at a large distance D from a crucible 972. Its facets to be metallised are positioned perpendicular to a line between point A at the middle of the crucible and point A at the center of the grating. Evaporation is performed through mask 974 using classical filament evaporation or electron gun evaporation.

In accordance with the present invention deflection gun evaporation is preferred. Prior to doing this, it is desirable to heat the substrates, to remove adsorbed contaminants. A 3 kW sheathed element radiant heater can be fitted into the top of the chamber below a reflector and controlled to give a constant substrate temperature. Alternatively, quartz-halogen heating units may be fitted to reflectors, mounted on a water-cooled ring which is fastened to support rods, below the substrate holder and shielded from the evaporant stream.

In order to produce good adhesion between the film and the surface on which the film is to be deposited, it is necessary to free the surface from molecular layers of gas, water or grease before the film is deposited. This is done by cleaning of the components with a solvent, such as freon, alcohol or the like, before they are placed in the vacuum chamber and then, after pumping the vacuum, exposing the surfaces to ionic bombardment of a high tension glow discharge.

The filament is heated by an electric current until the material evaporates. The resistance-heated filament is supplied from a low-voltage high-current AC stepdown transformer and, as the amount of current required is high, the transformer must be designed to take the heat load resulting from continuous duty at 10 volts and 400 amperes or 20 volts and 200 amperes. A variable transformer is needed to control the input to the power transformer primary. Examination of an ammeter in the line between the variable and power transformer enables the operator to warm up a source slowly and so prevent blasting the coating material in molten globs from the filament.

Figure 14:
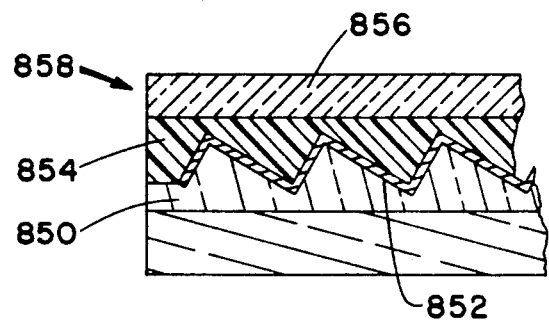
FIG. 14 illustrates formation of a replica.
Figure 16:
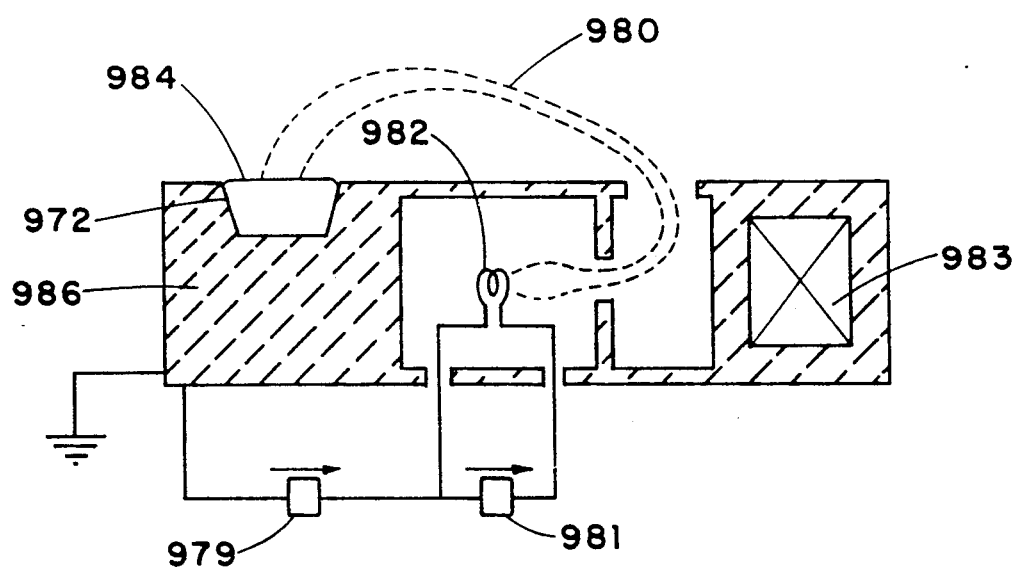
FIG. 16 illustrates the apparatus forming the crucible of FIG. 15.

As is shown in FIG. 16, electrons 980 driven by high voltage source 979 are emitted from a hidden hot filament 982 driven by filament supply 981 and accelerated in the electrical field are deflected over approximately 270° by magnetic deflection means 983 and focused on melted evaporation material 984. The relatively small amounts of evaporated material from the hot filament 982 cannot contaminate the film to be deposited because of the use of shield 986. A high voltage in the range of 6–10 kV accelerates the electrons toward the anode which forms crucible 972 in FIG. 14.

The size of the focal spot can be varied by variation of the Wehnelt potential and in addition there is an electromagnetic X-Y sweep available on commercially available apparatus. A power density of some 10 kW cm$^{-2}$ is required for metals. Scanning is performed only in a direction parallel to the grating grooves.

A further advantage of the electron beam gun lies in the possibility of using various crucible sizes and shapes. The vapour molecules spread from the source in all directions in straight lines, as there are practically no gas molecules in their path with which they can collide. The vapour condenses on any "cold" surface and a film is formed, the thickness of which depends on the duration and the rate of evaporation, the geometry of the source and the distance between the source and the coated surface.

Uses of the invention are contemplated to extend to spectrometry, spectrofluorimetry, and astronomy.

While illustrative embodiments of the invention have been described above, it is, of course, understood that various modifications will be apparent to those of ordinary skill in the art. Such modifications are within the spirit and scope of the invention, which is limited and defined only by the appended claims.

I claim:

1. A diffraction grating, comprising a plurality of grooves formed by a plurality of first facets having a first set of propagative optical characteristics and all generally positioned with a first orientation in a local area, and a plurality of second facets having a second set of propagative optical characteristics and all generally positioned with a second orientation in said local area, said first facets being oriented to transmit and diffract light having a wavefront shape and incident thereon and said second facets being oriented and having propagative characteristics to substantially maintain said wavefront shape in said diffracted light substantially without discontinuity.

2. A diffraction grating as in claim 1, wherein said second facets are oriented generally parallel to the direction of propagation of said diffracted light.

3. A diffraction grating as in claim 1, wherein said grooves are formed in an optically transparent layer and said first set of propagative optical characteristics comprises high transmissiveness, and further comprising a transmissive coating disposed on said first facets for providing said first set of optical characteristics and said second set of propagative optical characteristics comprising high reflectivity and further comprising a conductive surface disposed on said second facets for providing said second set of optical characteristics.

4. A diffraction grating as in claim 3, wherein said transmissive coating comprises a single layer having a thickness of a quarter wavelength.

5. A diffraction grating as in claim 4, wherein said transmissive coating is selected from the group consisting of Mg F$_2$ and Th F$_4$.

6. A diffraction grating as in claim 4, wherein said transmissive coating comprises multiple layers having a thickness of a quarter wavelength.

7. A diffraction grating as in claim 6, wherein said layers comprise alternating materials selected from the group consisting of: 1) Mg F$_2$ and Hf O$_2$, or 2) Ti O$_2$ and Mg F$_2$, or 3) Th F$_4$ and Si O$_2$.

8. A diffraction grating as in claim 3, wherein said first facets are substantially perpendicular to said second facets.

9. A diffraction grating as in claim 8, further comprising means for supporting said transparent layer at an angle where light incident on said first facets is incident thereon at a substantially right angle to said facets.

10. A diffraction grating as in claim 3, wherein said first and second facets are formed in a transparent locally planar wafer of material.

11. A diffraction grating as in claim 10, wherein said wafer of transparent material is curved.

12. A diffraction grating as in claim 11, wherein said curved wafer of transparent material is convex whereby focusing of said rays transmitted through said first facets is achieved.

13. A diffraction grating as in claim 1, wherein said first set of optical characteristics comprise high reflectivity and further comprising a reflective dielectric coating for providing said first set of optical characteristics and said second set of propagative optical characteristics comprise high conductivity, and further comprising a metallic coating disposed on said second facets to form a reflective layer.

14. A diffraction grating as in claim 1, wherein said first and second facets are disposed on and formed by a transparent layer and further comprising a transparent substrate for supporting said transparent layer in a position where said second facets are substantially parallel to light transmitted through said first facets as said light travels through said transparent layer.

15. A diffraction grating as in claim 1, wherein said first facets form an angle with respect to said second facets in the range between 60° and 120°.

16. A method of manufacturing a diffraction grating comprising the steps of:
    (a) cutting a plurality of first facets in a transparent substrate, said first facets being cut to have a first orientation;
    (b) cutting a plurality of second facets in said transparent substrate, said second facets being cut to have another orientation; and
    (c) depositing a reflective material on said second facets, wherein said reflective material is deposited by depositing said reflective material over all of said facets and then removing said reflective material from said first facets.

17. A method as in claim 16, wherein a transmissive coating is deposited on said first facets.

18. A method of manufacturing a diffraction grating for use with light falling on said grating at a desired angle comprising the steps of:
    cutting a plurality of first facets and second facets in a substrate, said first facets being cut to have a first orientation, and said second facets being cut to have another orientation to form a master grating in said substrate, depositing a conductive layer on said master grating, molding in epoxy a replica of said master grating by depositing epoxy on said reflective material, curing said epoxy until said epoxy hardens and adheres to said conductive layer, separating said hardened epoxy layer with said metal adhered thereto from said master; and etching away the metal from moulded first facets moulded by said first facets, said first and second facets being oriented with respect to each other in positions which result in the transmission of light incident on moulded first facets in a direction substantially parallel to facets moulded by said second facets.

19. A transmission diffraction grating, comprising a transparent member defining an input face formed by a plurality of grooves formed by a plurality of first facets having a first set of propagative optical characteristics and all generally positioned with a first orientation in a local area and a plurality of second facets having a second set of propagative optical characteristics and all generally positioned with a second orientation in said local area, said first facets being oriented to transmit and diffract light incident thereon at a particular angle and having a particular wavefront shape, and said second facets being oriented and having propagative characteristics to substantially maintain said wavefront shape in said diffracted light substantially without discontinuity, said transmitted light being output through an output face of said member.

20. A diffraction grating as in claim 19, further comprising means for supporting said transparent layer in a position where said second facets are substantially parallel to light transmitted through said first facets as said light travels through said transparent member.

21. A diffraction grating as in claim 28, wherein said first facets are substantially perpendicular to the direction of propagation of said incident light.

22. A diffraction grating as in claim 20, wherein said first facets form an acute angle with respect to said second facets.

23. A diffraction grating as in claim 20, wherein said first facets form an obtuse angle with respect to said second facets.

24. A diffraction grating, comprising an optically transmissive grating element having an input face and an output face and having a plurality of grooves defined in said input face, grating structure being formed by a plurality of first substantially planar facets for transmitting light incident on said first facets and all generally positioned with a first orientation in a local area and a plurality of second substantially planar facets defined in said input face and all generally positioned with a second orientation in said local area, said first facets being oriented to transmit light incident thereon at a particular angle and said second facets being oriented to be generally parallel to light transmitted through said first facets and a layer of conductive material deposited on said second facets to reflect said transmitted light.

* * * * *